United States Patent
Schmidhauser et al.

(10) Patent No.: US 6,232,405 B1
(45) Date of Patent: May 15, 2001

(54) SMA RESIN AMIC ACIDS

(75) Inventors: John C. Schmidhauser, Tredyffrin, PA (US); Lisa M. Hahn, Columbus, OH (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/496,472

(22) Filed: Feb. 2, 2000

(51) Int. Cl.[7] .................. C08F 220/08; C08F 220/66; C08F 223/04; C08L 35/00; C09D 11/10
(52) U.S. Cl. ............... 525/327.6; 525/207; 524/548; 524/555; 523/160
(58) Field of Search ............................ 523/160, 161; 524/548, 555, 612, 517; 525/207, 218, 327.6

(56) References Cited

U.S. PATENT DOCUMENTS

| | | | |
|---|---|---|---|
| 3,432,479 | * 3/1969 | Verdol et al. ................ | 525/327.6 |
| 4,070,152 | * 1/1978 | Pentz ............................. | 8/115.6 |
| 4,618,655 | * 10/1986 | Dehm et al. ................... | 525/344 |
| 4,857,595 | * 8/1989 | Kazmierzak et al. ......... | 525/142 |
| 4,963,188 | * 10/1990 | Parker .......................... | 524/549 |
| 5,244,971 | * 9/1993 | Jean-Marc .................... | 525/64 |
| 5,393,814 | * 2/1995 | Chen ............................. | 524/219 |
| 5,596,027 | * 1/1997 | Mead et al. ................... | 523/161 |
| 5,889,083 | * 3/1999 | Zhu ............................... | 523/161 |
| 5,954,866 | * 9/1999 | Ohta et al. .................... | 106/31.89 |
| 5,977,209 | * 11/1999 | Breton et al. ................. | 523/160 |

FOREIGN PATENT DOCUMENTS

10204360 * 8/1998 (JP) .

OTHER PUBLICATIONS

CA No. 117:213258, 1992.

* cited by examiner

Primary Examiner—Vasu Jagannathan
Assistant Examiner—Callie E. Shosho

(57) ABSTRACT

Water soluble SMA resin amic acids are provided, as are methods for using the same to prepare water based pigment dispersions and inks.

10 Claims, No Drawings

SMA RESIN AMIC ACIDS

BACKGROUND OF THE INVENTION

This invention relates to water soluble styrene-maleic anhydride ("SMA") resin arnic acids (amide-carboxylic acids) and to their use to prepare either (a) metallic pigment dispersions and metallic inks based thereon which are typically used for printing on paper and plastic substrates or as part of a decorative coatings formulation, or (b) organic pigment dispersions and water-based inks based thereon which are typically used for printing.

Since most polymeric surfactants currently used to prepare metallic pigment dispersions are salts of polycarboxylic acids, and have basic pHs, they give dispersions with poor stability and poor appearance due to tarnishing of the metallic pigment particles.

Similarly, current organic pigment dispersions are typically prepared using ammonium salts of styrene-acrylic acid polymers as the dispersing resin. These viscous dispersions have pigment loading and color limitations.

While SMA amic acids have been previously reported, they do not have the structure or water solubility of those of the instant invention. For example, Chem Abstract No. 117:213258 reports on a patent disclosure of the amic acid of SMA and cyclohexylamine, which composition would not be water-soluble.

BRIEF SUMMARY OF THE INVENTION

Herein provided, among other things, are water-soluble SMA resin amic acids which are the reaction product of an SMA resin having a weight average molecular weight (Mw) of up to about 50,000 (preferably up to about 10,000) and an acid number of at least about 270 (preferably at least about 350) with a low molecular weight primary or secondary amine (preferably a primary amine having 1–4 carbon atoms); water based pigment dispersions for inks which comprise an aqueous solution of said SMA resin amic acid, metallic pigment (preferably an aluminum or copper-bronze alloy) or organic pigment, and water (preferably combined with other conventional additives such as defoamers and surfactants); metallic ink compositions which comprise said metallic pigment dispersion, additional water, additional dispersing agent comprising the aforesaid amic acid (optionally in combination with another dispersing agent) and an emulsified polyolefin wax; and printing ink compositions which comprise said organic pigment dispersion, additional water, additional dispersing agent selected from the aforesaid amic acid and/or a styrene-acrylic acid resin, and a water-based styrene-acrylic ester emulsion.

DETAILED DESCRIPTION

It has now been discovered that it is possible to prepare SMA resin amic acids which have high solubility in water, low solution viscosity and a near neutral pH, all properties which are beneficial for use in preparing superior metallic pigment dispersions and inks which solve many of the foregoing problems of instability, tarnishing and the like, as well as superior organic pigment dispersions which are less viscous at a given weight percent solids, enabling one to prepare higher pigment-solids, higher color dispersions. The arnic acids can disperse organic pigment at neutral and slightly acidic pH, a quality not possible with styrene acrylics; this is advantageous for preparing dispersions of alkaline sensitive pigments such as basic dye complex pigments including rhodamine (pigment red 81) and alkali blue.

Useful SMA resins include any resin that has a low enough molecular weight to be useful as a polymeric surfactant in dispersing or emulsifying applications and has an acid number of at least about 270 (preferably at least about 350). So, while a Mw of 10,000 or less is preferred, polymers with Mw of up to 50,000 are useful. The styrene:maleic anhydride ratio typically ranges from 4:1 to about 1:1, although preferred resins have a ratio of about 1:1 since they give amic acid products with higher water solubility. The SMA resins can also be partially esterified, as long as there are some anhydride groups left in the structure to react with the amine to form the amic acid groups. Examples of useful SMA resins are SMA 1000, a styrene/maleic anhydride resin available from Elf Atochem which as a Mw of 5,500, an acid number of 475, and a styrene:maleic anhydride ratio of about 1:1; SMA 17352, a partially esterified SMA resin available from Elf Atochem which has a Mw of 7,300, an acid number of 270 and a styrene:maleic anhydride ratio of about 1.5:1; and SMA 3000, a styrene/maleic anhydride resin available from Elf Atochem which has a Mw of 9,500, an acid number of 275, and a styrene:maleic anhydride ratio of about 3:1.

The structure of the low molecular weight primary or secondary amine useful for reacting with the SMA resin is only limited in that it should give an amic acid product that has water solubility. As such, we have found that particularly useful amines are monoamines containing a hydrocarbon group of 4 carbons or less. Monoethyl or monomethyl amines are preferred since they give amic acid products with the highest water solubility. However, amines with other functionality can also be used. For example, 2-amino-2-methyl-1-propanol and N,N-dimethylaminopropyl amine have been found to be useful.

The molar ratio of amine to SMA resin anhydride groups is preferably about 1 to 1, but can include any range of compositions, as long as predominantly the amic acid is formed and, preferably, as long as the product forms a water solution with a pH of approximately 7. As such, typical amine to anhydride ratios are from about 0.75 to about 1.25. The preferred method of preparation is to react a water/SMA resin slurry with the amine to give a water solution of the SMA amic acid. The product from the reaction is the mono-amide, mono-carboxylic acid derivative of the SMA resin, commonly referred to as the amic acid derivative.

The SMA resin amic acid solutions are particularly useful for making water-based pigment dispersions. Useful metallic pigments include aluminum, copper or bronze alloys which are typically in the form of powders or flakes in dry or paste form, the metallic dispersions exhibiting better stability and lower tarnish than previously possible. Typical metallic pigments are MD 77 bronze, a copper/bronze alloy powder, MD 90, a copper flake, and MD 2080-0435 aluminum, an aluminum powder, all of which are available from MD Both. Useful organic pigments include copper phthalocyanine blue (15:3), such as DC 3127 available from Daicolor-Pope, Inc., lithol rubine red pigments, such as those available from Sun Chemical, Inc. or Uhlich Color Co., and rhodamine red pigments such as those available from CDR Pigments & Dispersions or Daicolor-Pope, Inc.

The weight ratio of pigment to amic acid in the metallic and organic dispersions is typically from about 3:1 to about 8:1. In addition to water, a variety of additives can be used as needed in these preparations, including surfactants and defoamers.

A typical formulation for a metallic pigment dispersion can contain the following proportional amounts by weight:

about 20–50% pigment (preferably 35–45%), 15–40% amic acid, as a 40% solids water solution (preferably about 15–19%), 1–5% surfactant (preferably about 1–3%), 0.5–3% defoamer (preferably about 0.5–1.5%), and about 2–63.5% water (preferably about 30–50%). Typical surfactants include Arlasolve 200, a poly(ethyleneglycol) ester of fatty alcohol available from ICI, and CO 720, an ethoxylated nonyl phenol available from Rhodia. Typical defoamers include XHD 47J and Dee Fo PI-35, polysiloxane polymers available from Ultra Additives. Conventional techniques are used for preparing the dispersion, as is illustrated in the examples. The dispersion is typically prepared in concentrated form and then diluted with water, additional dispersing agent (amic acid by itself or in combination with another dispersing resin such as polyurethane and/or styrene-butadiene rubber and/or a polyester resin) and an emulsified polyolefin wax such as emulsified polyethylene wax and/or a micronized wax such as polyethylene and/or polytetrafluoroethylene (PTFE), to form the finished metallic ink. Other conventional additives, such as additional defoamer and surfactant, can also be added.

A typical formulation for an organic pigment dispersion can contain the following proportional amounts by weight: about 20–50% pigment (preferably 30–45%), 10–30% amic acid, as a 40% solids water solution (preferably about 15–25%), 0–3% defoamer (preferably about 0.5–1.5%), and about 17–70% water (preferably about 30–50%). Conventional techniques are used for preparing the dispersion, as is illustrated in the examples. The water-based printing inks based on these dispersions are typically prepared by mixing the same with a water-based styrene-acrylic ester emulsion (such as ECO 2177 available from SC Johnson or Lucidene 605 available from Morton International), additional dispersing agent (amic acid by itself and/or a styrene-acrylic acid resin (such as Joncryl 63 available from SC Johnson), and water. Other conventional additives, such as additional defoamer, can also be added.

EXAMPLES

The examples which follow illustrate the invention without limiting it.

All parts and percentages are by weight unless otherwise indicated.

The following procedure was used to prepare the metallic pigment dispersion: All liquid ingredients were weighed into a blender except the amic acid and mixed for 20 seconds. Metallic pigment was weighed into a separate container. Small amounts of metallic pigment were spooned into the blender with the blender stopped. The ingredients were mixed for another 20 seconds. This procedure was repeated until all of the pigment was blended in. The amic acid solution was then added. The pH was adjusted to 7 with 2-amino-2-methyl-1-propanol. The ingredients were mixed for another 5 minutes and then decanted.

The following procedure was used to prepare the organic pigment dispersion: All liquid ingredients were weighed into a blender and premixed. The pigment was then weighed in and mixed at low speed until wet, then premixed at high speed for 10 minutes, following which the dispersion was milled at 5000 rpm in a horizontal media mill. After cooling the pH was adjusted to about 8.5.

The following procedure was used to prepare ink from the metallic and organic dispersions: The dispersion was weighed into a container. The dispersing agent(s) and other ingredients were then slowly added with mixing.

Example 1

Preparation of Amic Acid from SMA 1000 and Monomethyl Amine

A slurry of 120 grams SMA 1000 and 480 grams water was heated to 80° C. Monomethyl amine (59.25 grams of a 40% water solution, 1.2 molar equivalent amine per mole resin anhydride) was added to the stirred SMA resin slurry at such a rate that the temperature remained below 90° C. After the addition of amine was complete, the resulting mixture was stirred at 80° C. for an additional 2 hours. The product (designated X1000MA) was a clear, golden solution, with the following characteristics: 27% solids, pH of 6.5, and solution viscosity of 50 mPa. Similar results were obtained when monoethyl amine was used as the reactant, the product being designated X1000EA.

Example 2

Metallic (Gold) Dispersion Formulation using Copper/Bronze Alloy

MD 77 Bronze—52.50 parts
X1000MA from Ex. 1—18.75 parts
Dee Fo PI35—1.70 parts
Arlasolve—3.00 parts
Water—74.05 parts Example 3

Metallic Ink Fonnulation using Amic Acid as the dispersing resin

SMA resin amic acid (40% solids)—47.5%
water—2.0%
MD 77 dispersion from Example 2—48.5%
Dee Fo PI-35—0.5%
Liquitron 440 polyethylene wax dispersion from Carroll Scientific, Inc.—1.5%

Example 4

Blue Organic Pigment Dispersion Formulation

DC 3127 blue pigment—38.0%
X1000MA from Ex. 1—20.7%
Dee Fo PI-35 defoamer—0.7%
Water—40.6%

Example 5

Preparation of Blue Ink from Organic Pigment Dispersion

Pigment dispersion from Ex. 4—34.2%
X1000MA—10.6%
Lucidene 605 (water styrene-butylacrylate ester emulsion)—46.9%
Water—8.1%
Dee Fo PI-35—0.2%

We claim:

1. An aqueous solution of a water soluble SMA resin amic acid reaction product of an SMA resin having a weight average molecular weight of up to about 50,000 and an acid number of at least about 270 with a low molecular weight primary or secondary amine.

2. An aqueous solution as in claim 1 wherein the SMA resin has an acid number of at least 350.

3. An aqueous solution as in claim 1 wherein the amine is a primary amine having 1–4 carbon atoms.

4. A water based pigment dispersion for inks comprising the aqueous solution of claim 1, metallic or organic pigment, and water.

5. A dispersion as in claim 4 which further comprises a surfactant and a defoamer.

6. A dispersion as in claim 4 wherein the pigment is an organic pigment.

7. A printing ink composition comprising the dispersion of claim 6; water; and a water based styrene-acrylic ester emulsion.

8. A dispersion as in claim 4 wherein the pigment is a metallic pigment.

9. A dispersion as in claim 8 wherein the pigment is selected from an aluminum, copper or bronze alloy.

10. A metallic ink composition comprising the dispersion of claim 8, water, and an emulsified polyolefin wax.

* * * * *